United States Patent Office.

JAMES F. WILLCOX AND OLIVER WILLCOX, OF BROOKLYN, NEW YORK.

PROCESS OF DEFECATING AND CLARIFYING SACCHARINE LIQUORS.

SPECIFICATION forming part of Letters Patent No. 303,776, dated August 19, 1884.

Application filed June 19, 1884. (No specimens.)

*To all whom it may concern:*

Be it known that we, JAMES F. WILLCOX and OLIVER WILLCOX, citizens of the United States, residing in the city of Brooklyn, county of Kings, and State of New York, have invented a new and useful Improvement in Processes of Defecating and Clarifying Saccharine Liquors, of which the following is a full, clear, and exact description.

The object of the invention is to eliminate from saccharine liquors all of the matters (other than sugar and water) therein contained, and is generally known as "defecation" and "clarification."

The processes most generally used at the present time may be classified under the heads of those depending upon the application of heat, upon the use of chemicals in connection with heat, and upon filtration, &c. Our invention belongs, mainly, to the second class, inasmuch as the process hereinafter described depends, chiefly, upon the employment of certain chemical agents.

The invention consists in the treatment of saccharine liquors in a cold state with a solution of albumen and water; also, in the process of treating the saccharine liquor in the cold state, subsequent to the addition of the albumen solution, with an aqueous solution of acid, and then heating the same to about 190° Fahrenheit; also, in the process of treating the saccharine liquor, after heating the same to about 190° Fahrenheit, with cream of lime until neutral; also, in the treatment of the saccharine liquor, after being made neutral, with the dilute acid solution till it is in the slightest degree acid, then filtering.

Our method of practically operating the invention hereinafter claimed and described is as follows: The juice, being expressed from the cane by any well-known means, is run through strainers into the defecator, which holds about five hundred gallons. Into a separate vessel we place about nineteen ounces (more or less, according to the state of purity the juice is in) of dried egg albumen, to which we add enough fresh juice or water to dissolve the same. We do not limit ourselves to egg albumen, as we find that most of the protein series can be made to act in a like manner. This solution is then added to the contents of the defecator and agitated with the same until thoroughly incorporated. We now make another solution, consisting of one part of sixty-six degrees sulphuric acid and six parts of water. We do not limit ourselves to sulphuric acid, as we find that dilute solutions of other acids—such as acetic, muriatic, &c., also certain salts, as sulphate of alumina, &c., and compound salts, as the alums—will produce a similar effect. Of this solution we slowly add to the contents of the defecator and agitate with the same, no stated quantity, but only sufficient to cause the juice to show a strong acid action upon litmus. Another more certain test is to take a small quantity of the juice in a test-tube and heat it to ebullition. If the juice shows a strong floccular precipitate of a greenish color, enough of the acid solution has been added. Should the operator choose, he may add the dilute solution of acid to the contents of the defecator before the albumen solution, instead of after; but we prefer the aforesaid mode. We now apply heat to the defecator, and when the temperature of its contents is raised to about 190° Fahrenheit it is held at that point till the juice shows the greenish floccular precipitate aforesaid, when the heat is shut off, and enough cream of lime is slowly added to the juice till it is brought to neutral, as shown by its non-action upon litmus. We then add enough of the dilute solution of acid till the juice changes litmus-paper to a purplish blue. The contents of the defecator will now consist of a clear liquor and a large amount of greenish precipitate. The whole is then run into a tank and settled, or strained through a filter-press or other mechanical device for straining. The juice, after straining, will be clear and brilliant, and is run into a concentrator or vacuum-pan and treated in the usual manner.

We are aware that albumen has been used before for defecating saccharine liquors; also that it has been used in connection with lime for the same purpose. We desire to disclaim any and all processes that depend upon the addition of albumen and lime only to the liquor to be treated.

We are also aware that there are known processes of sugar defecation involving the use separately of quicklime and sulphurous acid in solution, these materials not being combined, but successively added to the liquor.

We are also aware of a process in use for defecating saccharine liquors depending upon the complete saturation of quicklime with sulphurous acid for its chemical reagent. We desire to disclaim all processes for defecating saccharine liquors depending upon the use of quicklime and sulphurous or any other acid only, separately or in a combined state, as forming no part of our invention.

In the process before described the combined chemical action of albumen, acid, and heat upon the impurities in the liquor causes a partial separation, and brings the residue of the impurities to such a state or condition that the lime used in neutralizing completes their precipitation. This use of lime is an economic one, as the albumen, if used in the liquor in a sufficient quantity in connection with the dilute solution of acid, will, on the liquor being heated to about 190° Fahrenheit, cause a complete separation and precipitation of the impurities, leaving the lime to act only as a neutralizing agent. We would also note the fact that in the use of the albumen solution and dilute solution of acid, as before described, a class of impurities are removed from the liquor that are not acted upon by lime and acid only used separately or combined.

A substantial advantage to be gained by the precipitation of the impurities and their removal from the liquor before it has been subjected to a degree of heat much above 190° Fahrenheit is that in the after concentration of the liquor it looses a large source of the material that darkens its color, and as the liquor is nearly neutral no inversion of sugar is produced by its acidity. Another advantage, also, is that by the removal of most of the gum, coloring-matter, and other deleterious substances prior to concentration a light-colored, clear, and brilliant sirup is produced, and, as a proof of its purity, it crystallizes in large, well-formed crystals of sugar of a light color; also, that by the removal of the bulk of the impurities, a larger percentage of crystallized sugar and a reduced percentage of sirup are obtained.

The foregoing process we have described as we have practically applied it to the juice of the sorghum-plant. We have also found it to be applicable equally well to the ordinary sugar-cane and to the manufacture of molasses-sugar from molasses imported from the West India islands. It is equally applicable to the improvement of raw sugars, these being dissolved in water prior to treatment with the albumen and acid solutions, &c.

Having fully described our invention, what we desire to claim and secure by Letters Patent is—

1. The defecation of saccharine liquors by their first treatment with albumen and acid, whether added to the liquor separately or combined.

2. The process of defecating and clarifying saccharine liquors, consisting in, first, adding to said liquor the albumen solution; second, then adding to the same the dilute solution of acid; third, then raising the temperature of the same to about 190° Fahrenheit; fourth, then adding to the same cream of lime until neutral; fifth, then adding to the same the dilute solution of acid until the liquor is in the slightest degree acid; sixth, then filtering the same, substantially as described.

JAMES F. WILLCOX.
OLIVER WILLCOX.

Witnesses:
FRED C. BAKER,
WM. H. WILLCOX.